United States Patent Office 3,022,062
Patented Feb. 20, 1962

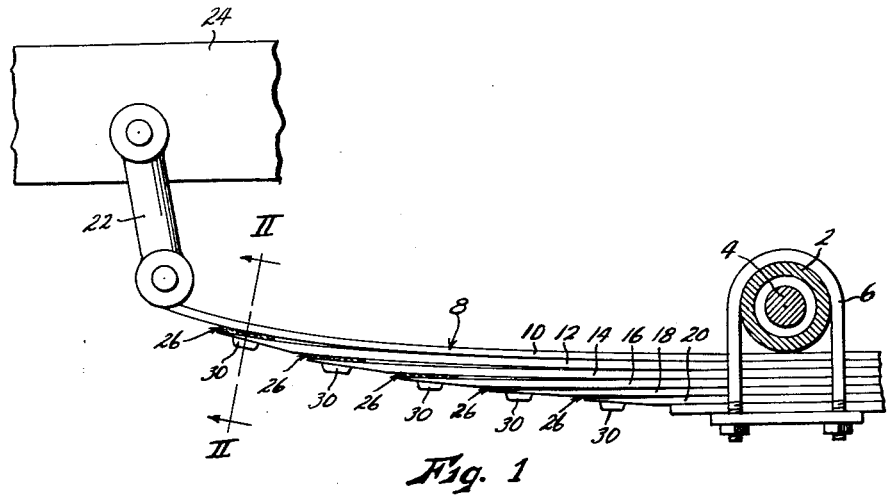
Fig. 1
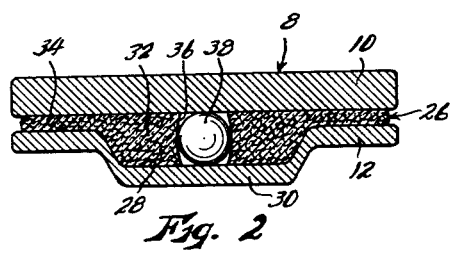
Fig. 2
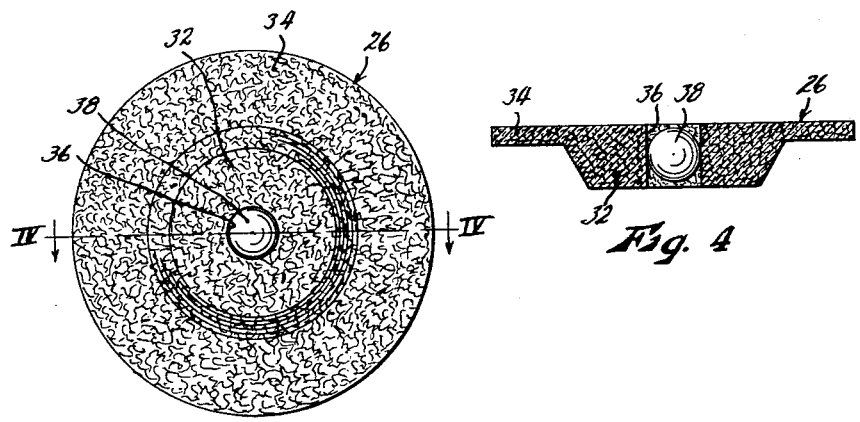
Fig. 3
Fig. 4
INVENTOR.
Elmo C. Kemp
BY John A. Hamilton
Attorney.

3,022,062
INSERT FOR AUTOMOBILE SPRINGS
Elmo C. Kemp, P.O. Box 484, Miltonvale, Kans.
Filed Dec. 17, 1959, Ser. No. 860,131
8 Claims. (Cl. 267—49)

This invention relates to new and useful improvements in the type of automobile springs ordinarily used in rear wheel suspensions and consisting of a plurality of resilient spring leaves of graduated lengths, and has particular reference to a pad or insert adapted to be placed between the end portions of each leaf and the next adjacent leaf.

The principal object of the present invention is the provision of a spring insert of the general character described which substantially eliminates the friction between the spring leaves attendant on the relative longitudinal movement of said leaves when the spring is flexed during normal usage. Generally, this object is accomplished by the inclusion of a ball bearing between each successive pair of leaves of a diameter such as to force said leaves slightly apart, and having only rolling contact with said leaves. Relative longitudinal movement of the leaves must occur in normal flexure of the spring, and while the leaves are nominally lubricated, such lubrication is difficult and often neglected, with the result that the leaves often become dry or even rusty so that movement between the leaves is impeded. This causes a certain hardness or stiffness in the spring, shortens the life of the spring and causes grinding or squeaking noises when the spring is flexed. The ball bearing insert contemplated by my invention corrects these defects and virtually eliminates the necessity of lubrication of the spring leaves. The added softness or yieldability of the springs provided by the insert also permits safer driving of the car on icy or slick roadways, better traction in mud or snow, and improved spring actions when striking bumps and when negotiating turns, as will appear.

Another object is the provision, in a spring insert of the type described, of novel means for lubricating the ball bearing itself, retaining it in position, and sealing it against the entry of dirt and grime.

Other objects are simplicity and economy of construction, efficiency and dependability of operation and adaptability for use with virtually any type of spring of the plural-leaf type.

With these objects in view, as well as other objects which will appear in the course of the specification, reference will be had to the drawing, wherein:

FIG. 1 is a fragmentary side elevational view of a conventional automobile spring and parts related thereto, and incorporating therein inserts embodying the present invention;

FIG. 2 is an enlarged sectional view taken on line II—II of FIG. 1,

FIG. 3 is an inverted plan view of one of the inserts shown separately from the spring, and drawn to an enlarged scale, and FIG. 4 is a sectional view taken on line IV—IV of FIG. 3.

Like reference numerals apply to similar parts throughout the several views, and the numeral 2 applies to the rear axle housing of an automobile, said housing carrying the axle 4. Affixed to said axle housing by U-bolts 6 is the central portion of a multiple-leafed spring indicated generally by the numeral 8 and consisting of a series of elongated leaves 10, 12, 14, 16, 18 and 20 of graduated lengths, the upper leaf 10 being the longest and the lower leaves being successively shorter. While only about half the total length of the spring is shown, it will be understood that the other end portion thereof, extending to the right from axle housing 2, is substantially identical to that shown. One end of upper leaf 10 is pivotally connected by means of link or shackle 22 to the automobile frame 24. The other end of said upper leaf (not shown) is also connected to automobile frame 24, though usually by a simple pivot connection rather than by a shackle link. The shackle permits the spring to adjust its length responsively to vertical movement of axle housing 2.

An insert indicated generally by the numeral 26 and forming the subject matter of the present invention, is placed between each end portion of each of spring leaves 12, 14, 16, 18 and 20, and the leaf immediately thereabove, as indicated in FIG. 1, the structure and disposition of the inserts being shown in detail in FIGS. 2–4. Each of leaves 12, 14, 16, 18 and 20 has a circular depression 28 formed in the upper surface thereof adjacent each end thereof. These depressions are preferably formed by offsetting portions of the leaf downwardly prior to final tempering thereof. The downward projection 30 thus formed below the leaf does not contact the next lower leaf, as it depends from a portion of the leaf which is extended outwardly beyond the end of the next lower leaf.

Each insert 26, as best shown in FIGS. 3 and 4, consists of a circular disc formed of leather, fiber, or other suitable material which is resiliently compressible and which is porous. Said disc has a thickened central section 32 which is also circular, and a peripheral flange portion 34 of reduced thickness. The total diameter of the disc is preferably slightly less than the width of the spring leaves. A hole 36 is formed centrally through the disc, and a spherical steel bearing ball 38 is disposed within said hole.

In use, an insert 26 is placed between each end portion of each of leaves 12, 14, 16, 18 and 20, and the adjacent portion of the next higher leaf, with the thickened central portion 32 of the insert disc fitting snugly in the depression 28 of the lower leaf, and with the upper face of the disc bearing against the lower surface of the upper leaf, as best shown in FIG. 2. Before insertion, the disc is thoroughly impregnated with a lubricating oil. The diameter of ball 38 is greater than the depth of depression 28, so that said ball in contacting the upper leaf and the floor of said depression holds the body portions of the two leaves in spaced apart relation. This separation in maintained except in the central portions of the leaves, where said leaves are of course clamped together by U-bolts 6. The insert disc serves to position and hold the ball centrally in depression 28, to lubricate the ball, and to seal the area in which the ball is located against the entry of grit and dirt. For these reasons, it is desirable that the disc be tightly compressed between the spring leaves, though not sufficiently to prevent the ball from supporting the major portion of the pressure between the leaves. The compression causes the disc to hold the ball more firmly, to provide a tighter, more effective seal, and to exude oil to lubricate the ball. To provide said compression, the thick central portion 32 of the disc must have an initial or uncompressed thickness at least slightly greater than the diameter of the ball, and the flange portion 34 of the disc must have an initial thickness at least slightly greater than the amount the diameter of the ball exceeds the depth of depression 28.

When relative longitudinal movement between the leaves occurs during normal flexure of the springs, it will be permitted and accompanied by a slight rolling movement of the balls 38 between said leaves, not by frictional sliding movement either of the balls or between the leaves themselves, since the relatively movable portions of the leaves are held out of engagement with each other by the balls. Furthermore the balls themselves are well lubricated. Thus the relative movement of the leaves is rendered almost frictionless, thereby providing a softer, smoother and more resilient spring action. Also, less road shock will be transmitted to the automobile frame through the springs, further contributing to better riding properties. The leaves themselves, or the portions thereof which must move longitudinally relative to each other, are held out of contact, thereby eliminating most of the squeaking and grinding noises commonly associated with this type of spring, and virtually eliminating any necessity of lubrication. The inserts themselves contain a practically permanent and sealed lubricating system for the bearing balls 38.

It will be seen that ball 38 rolls for a slight distance along the floor of depression 28 during the relative leaf movement as described above, the movement of the ball on the depression floor being actually one-half of the relative leaf movement. Since if the ball movement on the depression floor were actually halted, either by contact with the depression wall or by the insert disc, the ball would then be forced to slide rather than roll on the upper leaf and thereby forfeit some of the benefits described above, it is desirable that the diameter of the depression be sufficiently large in relation to the ball size, and that the disc be sufficiently yieldable, and that the ball is free to roll on the depression floor throughout normal flexure of the spring. Although the depression diameter will therefore be affected by the overall spring design, for most automobiles a diameter of about three times the ball diameter, with a leather disc, has been found to be satisfactory. The relative softness or yieldability of the disc material is also a factor to be considered. This ball movement within the depression 28 also assists in the lubrication process, since it forces the ball into compressive contact with the disc material to squeeze oil therefrom. Depression 28 also serves as a well for retaining oil squeezed from the disc and which might otherwise leak out and be lost. The flange portion 34 of the disc seals the depression against the entry of dirt and grime.

It will be seen also that the use of a single ball between each pair of spring leaves, rather than a plurality of balls or rollers, permits the leaves to tilt or twist relative to each other about an axis longitudinal to the leaves, which tends to occur when the automobile negotiates a curve. The rolling or tilting action of the car due to centrifugal force tends to tilt the car frame 24 laterally relative to axle housing 2, and this tilting is translated into a twisting in the springs. Relative tilting or twisting of the leaves is rendered easier and smoother by virtue of the facts that the leaves are held apart by balls 38, and have substantially only single-point contact with said balls. This action causes the car to take turns more smoothly.

My device has also been found to provide safer driving on slick or icy roadways, and better traction in mud or snow. When a car is accelerated or decelerated, road thrust on the rear wheels tends to turn axle housing 2 about its axis, since the axle housing is supported only by the yieldable springs. Turning of the axle housing acts through U-bolts 6 and tends to flex the spring into an S-bend, which causes relative longitudinal movement of the spring leaves. This relative movement of the leaves is rendered much easier and smoother by my inserts as previously described, with the result that an accelerating torque applied to the wheels tends to be absorbed or stored partially in the springs, rather than delivered entirely and directly to the roadway. The power delivery to the wheels is thereby rendered smoother, slower and more gradual than would be possible without my inserts. Essentially the same is true when brakes are applied, the additional yieldability supplied by my inserts softening and momentarily slowing the braking action. Therefore, since skidding, or failure to obtain traction in mud or snow, starts or is initiated primarily at moments when acceleration or deceleration is commenced, my inserts contribute substantially to driving safety under these conditions.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. The combination, in a plural-leafed spring assembly wherein one leaf of each adjacent pair of leaves therein has a depression formed therein opening toward the other leaf of the pair and having a floor substantially parallel to the adjacent surface of said other leaf, and an insert comprising a single spherical bearing ball adapted to be inserted between said pair of leaves, bearing on the floor of said depression of said one leaf and the adjacent surface of said other leaf and having rolling contact therewith, the diameter of said ball being greater than the depth of said depression whereby said leaves are forced apart by said ball, and a retainer disc having an aperture formed therein in which said ball is positioned, said insert engaging in said depression and having frictional engagement with both of said leaves adjacent said ball, whereby to retain said ball in place between said leaves.

2. An insert as recited in claim 1 wherein the diameter of said depression is substantially greater than the diameter of said bearing ball, and wherein said disc is formed of a resiliently yieldable material.

3. An insert as recited in claim 1 wherein the diameter of said depression is substantially greater than the diameter of said bearing ball, and wherein said disc is formed of a porous, resiliently yieldable material impregnated with a lubricant.

4. An insert as recited in claim 1 wherein the diameter of said depression is substantially greater than the diameter of said bearing ball, and wherein said disc is formed of a resiliently yieldable material, having a relatively thick central portion adapted to substantially fill said depression and a relatively thin peripheral flange portion adapted to be positioned between said leaves adjacent said depression.

5. An insert as recited in claim 1 wherein the diameter of said depression is substantially greater than the diameter of said bearing ball, and wherein said disc is formed of a resiliently yieldable material, having a relatively thick central portion adapted to substantially fill said depression and a relatively thin peripheral flange portion adapted to be positioned between said leaves adjacent said depression, the normal thickness of said flange portion before compression being greater than the amount by which the diameter of said ball exceeds the depth of said depression.

6. An insert as recited in claim 1 wherein the diameter of said depression is substantially greater than the diameter of said bearing ball, and wherein said disc is formed of a resiliently yieldable material, having a relatively thick central portion adapted to substantially fill said depression and a relatively thin peripheral flange portion adapted to be positioned between said leaves adjacent said depression, the normal thickness of said flange portion before compression being greater than the amount by which the diameter of said ball exceeds the depth of said depression, and wherein said disc is impregnated with a lubricant.

7. An insert as recited in claim 1 wherein the diameter of said depression is substantially greater than the diameter of said bearing ball, and wherein said disc is formed of a resiliently yieldable material, having a relatively thick central portion adapted to substantially fill said depression and a relatively thin peripheral flange portion adapted to be positioned between said leaves adjacent said depression, the normal thickness of said flange portion before compression being greater than the amount by which the diameter of said ball exceeds the depth of said depression, and the normal thickness of said central portion before compression being greater than the diameter of said ball.

8. An insert as recited in claim 1 wherein the diameter of said depression is substantially greater than the diameter of said bearing ball, and wherein said disc is formed of a resiliently yieldable material, having a relatively thick central portion adapted to substantially fill said depression and a relatively thin peripheral flange portion adapted to be positioned between said leaves adjacent said depression, the normal thickness of said flange portion before compression being greater than the amount by which the diameter of said ball exceeds the depth of said depression, and the normal thickness of said central portion before compression being greater than the diameter of said ball, and wherein said disc is impregnated with a lubricant.

References Cited in the file of this patent

UNITED STATES PATENTS

| | | |
|---|---|---|
| 1,465,991 | Manby | Aug. 28, 1923 |
| 1,521,020 | Gullborg | Dec. 30, 1924 |
| 1,612,150 | Plank | Dec. 28, 1926 |
| 2,246,879 | Dow | June 24, 1941 |

FOREIGN PATENTS

| | | |
|---|---|---|
| 109,364 | Australia | Dec. 13, 1939 |
| 867,952 | France | Sept. 8, 1941 |